United States Patent [19]

Franz, Jr. et al.

[11] 4,355,267

[45] Oct. 19, 1982

[54] PROPULSION MOTOR CONTROL APPARATUS

[75] Inventors: James H. Franz, Jr., Murrysville; Stanley W. Jones, McMurray, both of Pa.

[73] Assignee: Westinghouse Electric Corp., Pittsburgh, Pa.

[21] Appl. No.: 258,509

[22] Filed: Apr. 29, 1981

[51] Int. Cl.³ .............................................. H02P 5/46
[52] U.S. Cl. ......................................... 318/89; 318/50; 318/56; 318/60; 318/63
[58] Field of Search .................. 318/49, 50, 56, 57, 318/60, 63, 79, 86, 112, 113, 345 C, 345 G, 248, 375, 95, 269, 434, 393, 376, 87, 88, 89

[56] References Cited

U.S. PATENT DOCUMENTS

| | | | |
|---|---|---|---|
| 2,186,227 | 1/1940 | Austin | 318/63 |
| 2,265,706 | 12/1941 | Tritle | 318/274 |
| 2,295,285 | 9/1942 | McNairy et al. | 318/57 |
| 2,400,998 | 5/1946 | Krapf | 318/63 |
| 2,515,982 | 7/1950 | Brane | 318/89 X |
| 2,523,142 | 9/1950 | Riley | 318/89 X |
| 2,605,454 | 7/1952 | Grepe | 318/380 |
| 3,324,373 | 6/1967 | Stamm | 318/274 |
| 3,504,256 | 3/1970 | Metcalfe | 318/246 |
| 3,601,670 | 8/1971 | Eriksson et al. | 318/87 |
| 3,803,454 | 4/1974 | Higuchi | 307/240 |
| 3,896,350 | 7/1975 | Kipp | 318/87 |

*Primary Examiner*—Ulysses Weldon
*Attorney, Agent, or Firm*—R. G. Brodahl

[57] ABSTRACT

A solid-state motor control apparatus operative with a plurality of series motors to determine the selection of a power mode of operation and a brake mode of operation, and including a plurality of current sensors to establish the current flow in the motor armatures and in the motor fields.

7 Claims, 6 Drawing Figures

PROPULSION MOTOR CONTROL APPARATUS

CROSS-REFERENCE TO RELATED APPLICATIONS

The present application is related to a patent application Ser. No. 86,380 filed Oct. 19, 1979 now U.S. Pat. No. 4,284,930 and entitled "Motor Controlled Apparatus and Method" by T. C. Matty, a patent application Ser. No. 902,001 filed Apr. 27, 1978 now U.S. Pat. No. 4,284,930 and entitled "Transit Vehicle Motor Effort Control Apparatus and Method" by T. C. Matty and a concurrently-filed patent application Ser. No. 258,852 by S. W. Jones and J. W. Franz and entitled "Vehicle Propulsion Motor Control Apparatus", that are assigned to the same assignee and the disclosures of which are incorporated herein by reference.

BACKGROUND OF THE INVENTION

It is known in the prior art to control the speed of a vehicle propulsion direct current series motor by a chopper apparatus including a thyristor switch device in series with the motor. Speed control of the motor is provided by varying the width of the voltage pulses supplied to the motor such that the resulting average power supplied to the motor establishes the operational speed thereof. A commutation circuit including a charge capacitor has been used to provide a biased voltage across a conducting thyristor device for commutating the conduction of that thyristor device. A traction motor is operative in a motoring mode when the passenger vehicle is being propelled or accelerated along a track and in a brake mode when the vehicle is being stopped or decelerated.

It is known in the prior art to control the operation of one or more transit vehicle motors with a chopper apparatus as described in U.S. Pat. Nos. 3,559,009 of J. M. Mills, 3,543,121 of L. G. Miller and 3,535,503 of H. C. Appelo et al.

As described in a published Article in the Westinghouse Engineer for March 1973 at pp. 34–41 the average voltage supplied to the motor armature is controlled by adjusting the ratio of chopper OFF-time to the chopper ON-time with the resulting average motor armature current determining the motor torque for moving the vehicle along a track. In the motoring or power mode of operation the motors of a vehicle are connected by mechanical switches in relation to a direct current voltage source such that current is supplied through a chopper when the chopper is ON and through the motors to ground. When the chopper is turned OFF, the energy stored in the motor reactor and the inductance of the motor field maintains current flow in the motor circuit through a free-wheeling diode. In the brake or deceleration mode of operation, the motors in the prior art were reconnected by mechanical changeover switches with the motors operative as self-excited generators to provide dynamic or regenerative braking of the vehicle. With the chopper ON, the motor current increases and with the chopper OFF, the current is forced into the power supply through the free-wheeling diode by the motor reactor.

It is known in the prior art as shown by U.S. Pat. No. 4,095,153 of T. C. Matty et al. to utilize a microprocessor chopper control of regenerative brake current buildup by providing an upper current limit to control chopper-ON operation and a lower current limit to control chopper-OFF operation.

SUMMARY OF THE INVENTION

In a motor control apparatus, including a plurality of DC series motors, a bridge arrangement of those motors is provided with one current sensing device operative with selected motor fields and another current sensing device operative with all of the motor armatures to sense the current in each armature leg of the bridge arrangement in relation to each of a power mode and a brake mode of operation of those motors.

DESCRIPTION OF A PREFERRED EMBODIMENT

Figure 1:
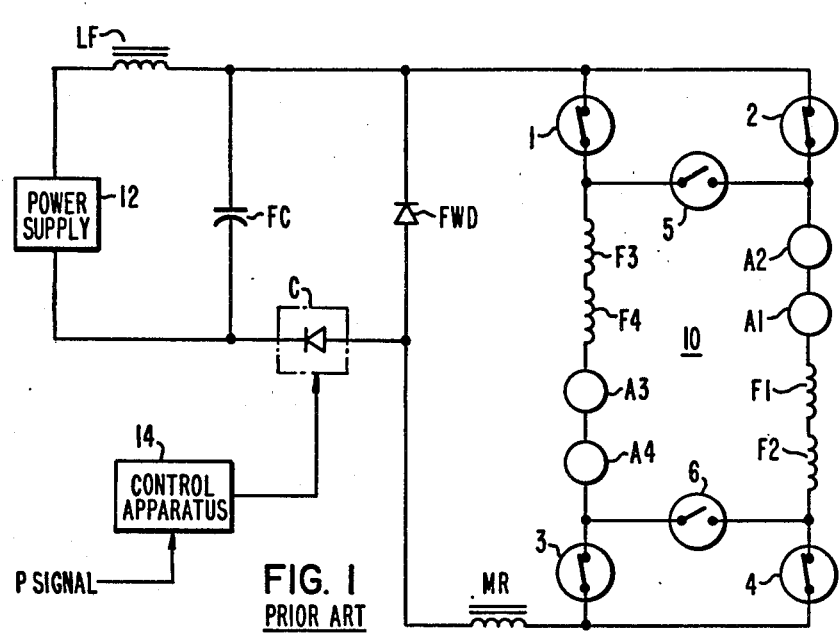
FIG. 1 shows a prior art motor control apparatus for a plurality of vehicle propulsion motors in the power mode.

FIG. 1 shows a prior art motor control apparatus for a plurality of vehicle propulsion motors operative in the power mode. The motors are DC series motors each including an armature and a field winding, with the first and second motor armature A1 and A2 being connected in series with the first and second motor field windings F1 and F2, while the third and fourth motor armatures A3 and A4 are connected in series with the third and fourth motor field windings F3 and F4, such that the four motors are connected with two in series and the two groups of two motors connected in parallel, as determined by closing the mechanical switches 1, 2, 3 and 4 and by opening the mechanical switches 5 and 6. In the power mode a chopper C is used to regulate the current in the motor circuit 10, turning the chopper C ON builds up currents in the motors by completing the circuit from the DC power supply 12 through the motors in the motor circuit 10 to ground. When the chopper C is turned OFF, the energy stored in the motor reactor MR and the inductance of the motors in the motor circuit 10 maintains current flow through the free-wheeling diode FWD. The operation of the chopper C in this regard is described in greater detail in the above-referenced published Article in the Westinghouse Engineer for March 1973.

Figure 2:
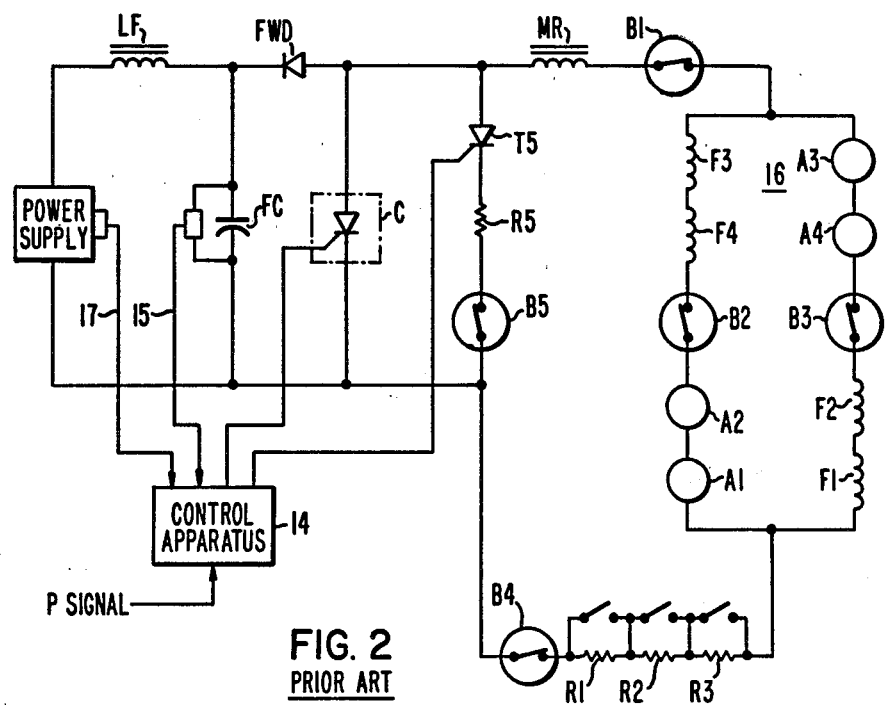
FIG. 2 shows a prior art motor control apparatus for a plurality of vehicle propulsion motors in the brake mode.

The average voltage applied to the motors is controlled by adjusting the ratio of the OFF-time to the ON-time of the chopper C. This adjustment is made by the control apparatus 14 in response to the effort request P signal for maintaining the desired average motor current and, therefore, the average motor torque. When operating with full voltage applied to the motors the chopper C switches at the normal frequency of approximately 218 Hz with an OFF-interval of about 6% of the total cycle time. FIG. 2 shows a prior art motor control apparatus for a plurality of vehicle propulsion motors operative in the brake mode. For the brake mode of operation the motors are changed to the arrangement as shown in the motor circuit 16 of FIG. 2 by means of well-known power brake changeover mechanical switches B1, B2, B3, B4 and B5 in accordance with the above-referenced Article in the Westinghouse Engineer for March 1973. The circuit shown in FIG. 2 is arranged for regenerative or dynamic braking with the motors operative as self-excited generators. The fields are connected to force load division between the paralleled generators. In regenerative braking the function of the chopper is the same as is its function in the power mode, with the ON/OFF ratio being regulated to maintain the desired current and with the greater motor current providing the greater braking to the vehicle. When the chopper C is turned ON, the current in the motor circuit 16 increases. When the chopper C is turned OFF, the current flowing in the chopper is forced back to the power supply 12 through the free-wheeling diode FWD by the motor reactor MR. The control apparatus 14 for logically controlling the operation of the chopper C during the brake mode also monitors the voltage 15 across the line filter capacitor FC the line voltage 17 to and control the chopper ON/OFF ratio in response to the P signal in such a manner as to prevent the capacitor voltage 15 from exceeding the line voltage 17.

Figure 3:
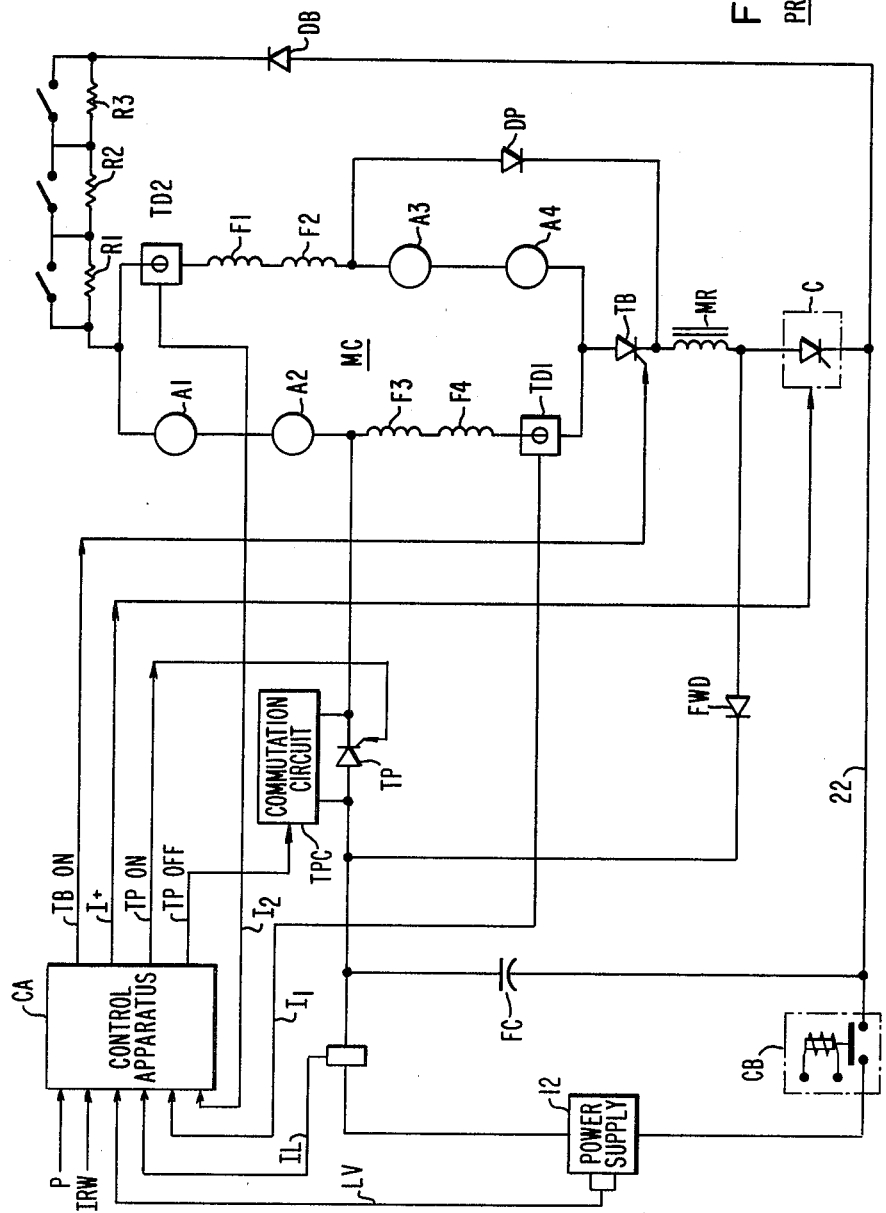
FIG. 3 shows a prior art motor control apparatus using solid-state switching devices to determine for a single propulsion motor one of a power mode and a brake mode of operation.

In FIG. 3 there is shown a prior art circuit arrangement to selectively provide a power mode connection arrangement with thyristor TP and diode DP conducting to establish a first branch circuit including motor armatures A1 and A2 in series with fields F1 and F2 and a second branch circuit including motor armatures A3 and A4 in series with motor fields F3 and F4. There can be selectively provided a brake mode connection with the thyristor TB and the diode DB conducting to establish a third branch circuit including motor armatures A1 and A2 in series with motor fields F3 and F4 and a fourth branch circuit including motor armatures A3 and A4 in series with motor fields F1 and F2. In addition, there can be selectively provided a transition mode connection arrangement with both the thyristors TP and TB conducting to energize the series-connected fields F3 and F4 in preparation for going from a coast operation into a brake mode of operation. The thyristor TP is commutated OFF when it is desired to provide the brake mode of operation after the transition mode connection has been provided.

A circuit breaker CB is provided to protect against a fault condition current should the main chopper C not commutate OFF for some reason in the power mode, and the circuit breaker CB would then operate in response to line current IL becoming larger than a predetermined safe value. As disclosed in greater detail in the above cross-referenced and concurrently-filed patent application Ser. No. 86,380, now Pat. No. 4,284,930 the main chopper thyristor switch C is gated by a conventional conduction control apparatus CA to close and become conductive and then is subsequently commutated to open and become not conductive as required to provide a desired average voltage across the motor armature A which determines the motor speed.

The control apparatus CA can be operative in accordance with the disclosure of the above cross-referenced application Ser. No. 902,001 and including a programmed microprocessor such as the Intel 8080. Such a control apparatus could be responsive to line current IL, the line voltage LV, the motor currents I1 and I2 provided by the transducers TD1 and TD2, a load weighed current request IRW and the effort request P signal. The control apparatus CA provides an output current request signal I+ to the chopper C. In addition, there is provided the ON-control pulse to the power thyristor TP and the OFF-control pulse to the power thyristor commutation circuit TPC. There is provided the On-control pulse to the brake thyristor TB. Each time the main chopper C is turned ON the voltage across the motor circuit MC and the motor reactor MR rises to the voltage of the power supply 12. Each time the main chopper C is turned OFF, the voltage across the motor circuit MC and the motor reactor MR falls to zero.

The motor control apparatus as shown in FIG. 3 provides a coast mode of operation where neither one of the power mode and the brake mode of the motor circuit MC is provided.

A Hall effect current sensing transducer TD1 is provided in the branch circuit including the fields F3 and F4 for sensing motor current I1. A Hall effect current sensing transducer TD2 is provided in the branch circuit including the fields F1 and F2 for sensing the motor current I2. The current sensing transducer TD1 operates to sense the current in fields F3 and F4 when both the power thyristor TP and the brake thyristor TB are simultaneously made conducting after a coast operation to flash-energize the fields F3 and F4 in preparation for a brake mode of operation when the power thyristor TP is commutated to begin the brake mode of operation.

Figure 4:
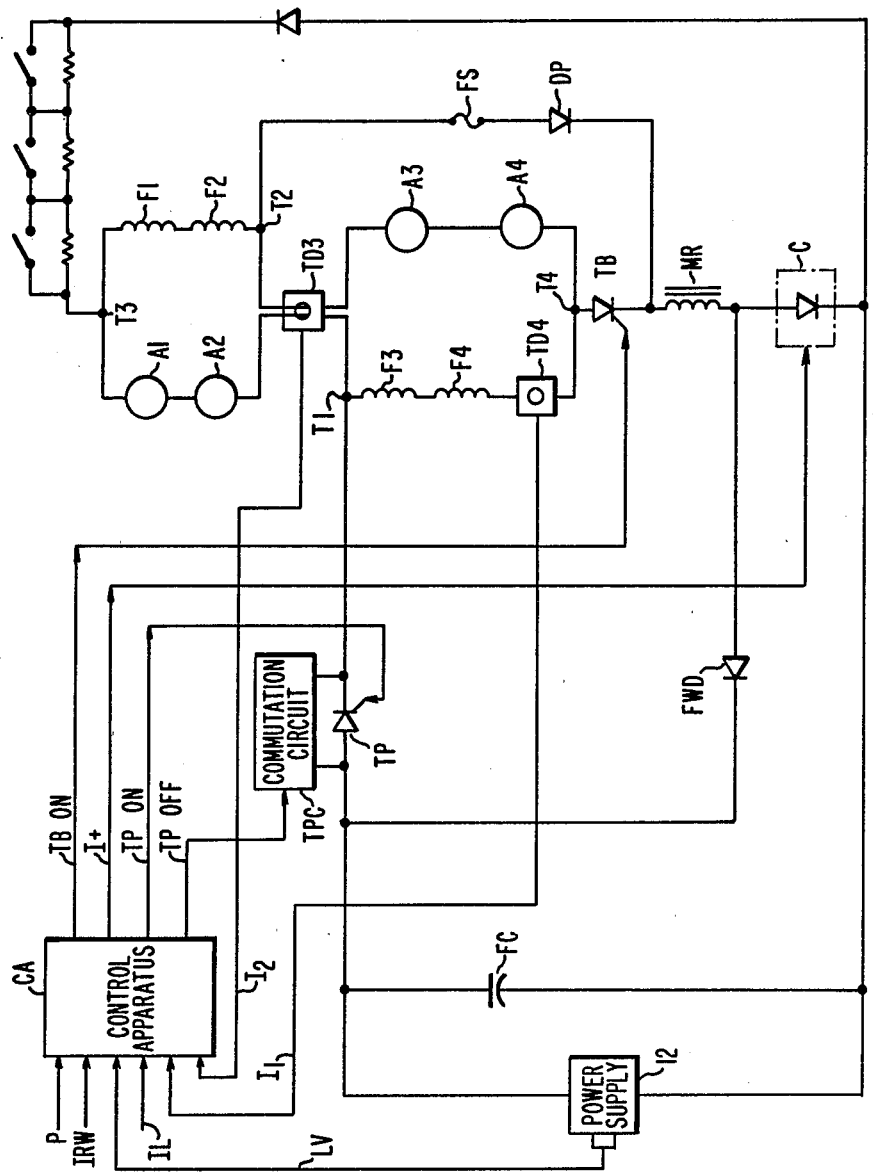
FIG. 4 shows the motor control apparatus of the present invention for a plurality of propulsion motors in one of a power mode and a brake mode of operation.

In FIG. 4 there is shown the solid state motor control apparatus of the present invention for a plurality of propulsion motors, in one of a power mode and a brake mode of operation, operative in a bridge circuit. When the thyristor TP becomes conductive to establish a power mode of operation in conjunction with the diode DP, this provides between terminals T1 and T2 a first parallel branch circuit including motor armatures A1 and A2 in series with motor fields F1 and F2 and a second parallel branch circuit including motor armatures A3 and A4 in series with motor fields F3 and F4. When the thyristor TB becomes conductive to establish a brake mode of operation, this provides between terminals T3 and T4 a third parallel branch circuit including motor armatures A1 and A2 in series with motor fields F3 and F4 and a fourth parallel branch circuit including motor armatures A3 and A4 in series with motor fields F1 and F2.

For the purpose of detecting current conditions, for example when an abnormally and objectionable fault current condition exists, it is desired to monitor the motor armature currents and to detect any motor current greater than a predetermined level. This detection of armature currents is desired in relation to the control of field shunt operations and to establish a change of armature current direction in the brake mode as compared to the power mode of operation.

In accordance with the present invention as shown in FIG. 4 and in the power mode, a current sensing transducer TD3 is connected in each of the first branch circuit to sense the current of motor armatures A1 and A2 and in the second branch circuit to sense the current of motor armatures A3 and A4, while a current sensing transducer TD4 is connected in the second branch circuit to sense the current of motor armatures A3 and A4. In the brake mode, the current transducer TD3 is connected in each of the third branch circuit to sense the current of motor armatures A1 and A2 and the fourth branch circuit to sense the current of the motor armatures A3 and A4, while the current transducer TD4 is connected in the third branch circuit to sense the current of motor armatures A1 and A2. After the coast mode, the current transducer TD4 is connected to sense the current in the motor fields F3 and F4 when both the power thyristor TP and the brake thyristor TB are conducting in preparation for going into the brake mode.

The current transducer TD3 will sense two currents and provide a double output current reading as compared to the current transducer TD4, such that the output of current transducer TD3 can be reduced to one-half for operation with the output of current transducer TD4. The two currents of the current transducer TD3 are additive in each of the power mode and the brake mode of operation.

An example of a suitable hall effect current sensing transducer to be used for TD3 and TD4 that is available at the present time in the open marketplace is F. W. Bell Model 5020.

The sensed current output signal from the transducer TD3 should be twice the sensed current output signal from the transducer TD4 in the power mode and in the brake mode. The current transducers TD3 and TD4 are bidirectional in operation, so the reversal of armature current direction is sensed when changing between the power mode and the brake mode.

The current transducer TD4 is provided to monitor the field current through the motor fields F3 and F4 when both of the power thyristor TP and the brake thyristor TB are simultaneously made conductive after a coast mode. The current transducer TD3 is provided to monitor the armature currents in each of the power mode and the brake mode. In addition, the current transducer TD3 operates to monitor the armature current change of direction when going between the power mode and the brake mode.

The current transducer TD3 operates to monitor a failure of the power diode DP which would result in a short circuit in the brake mode around the generating armatures A3 and A4. This would require making the brake thyristor no longer conductive to open this fault current circuit, and in view of the involved possible time delay a fuse device FS to respond to a predetermined large fault current might be included in this circuit with the power diode DP to provide additional protection against such a fault current.

Figure 5:
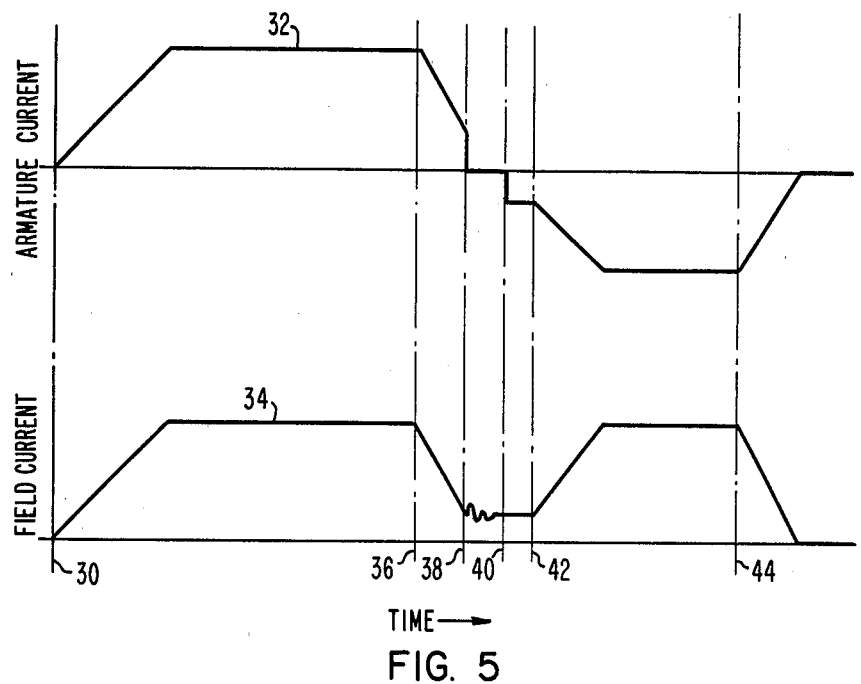
FIG. 5 shows operational current waveforms to illustrate the power and brake modes of the motor control apparatus of FIG. 4.
Figure 6:
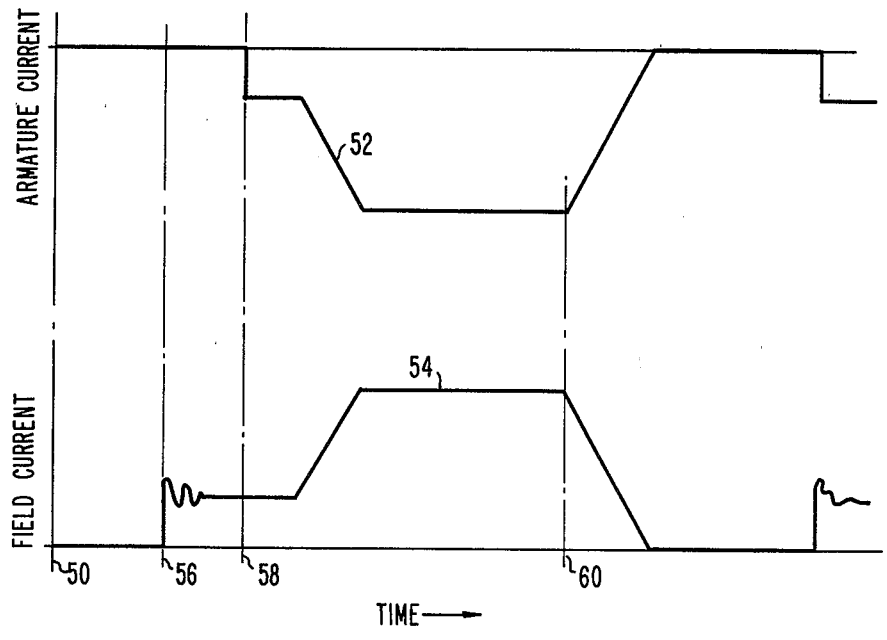
FIG. 6 shows operational current waveforms to illustrate the coast mode of the motor control apparatus of FIG. 4.

In FIGS. 5 and 6, there are shown the operational relationships of the various voltage waveforms to illustrate the operation of the motor control apparatus of the present invention.

In FIG. 5, there are shown current waveforms to illustrate the power mode and brake mode operations of the apparatus shown in FIG. 4 in accordance with the present invention. When the effort request P signal provided to the conduction control apparatus CA has a value above a predetermined level, such as 60 milliamps, the power mode of operation is initiated, with the power thyristor TP being fired to be conductive at time 30. The armature current of the motors is shown by curve 32, and when the power thyristor TP becomes conductive, this armature current normally builds up as determined by the jerk limiter to a regulated desired value as determined by and corresponding to the value of the P signal. The corresponding motor field current is shown by curve 34. At time 36 and when the P signal has a value below a predetermined level, such as 60 milliamps, the brake mode is initiated, and the P signal causes the motor current to drop in accordance with the jerk limiter operation and when a reasonable level of field current is reached after maybe a one second time interval at time 38 the brake thyristor TB is fired to be conductive. The armature current goes to zero as shown by curve 32 when the brake thyristor TB becomes conductive and the field current is regulated at a suitable value by the chopper main thyristor C as shown by curve 34 for a predetermined time period as may be desired, for example 25 milliseconds, between time 38 and time 40. When the field current is stabilized and when desired for the brake mode of operation, at time 40 the power thyristor TP is commutated to be not conductive by the commutation circuit TPC and the armature current now reverses as shown by curve 32. The field current shown by curve 34 and the armature current shown by curve 32 can not be increased, after a predetermined time period such as 25 milliseconds to settle the armature current, by the chopper main thyristor C and in accordance with the jerk limiter to provide the desired amount of brake effort. The time duration from time 38 to time 40 and the time duration from 40 to 42 can be empirically established for the particular motor circuit of a given vehicle, with the above value of 25 milliseconds being for purposes of example. At time 44 when brake effort is no longer desired, if the chopper main thyristor C stops conducting the respective armature and field currents will fall to zero as shown by the curves 32 and 34. If desired a return to power mode operation as previously described can then be made.

In FIG. 6, there are shown current waveforms to illustrate the coast mode operation of the apparatus shown in FIG. 4. Assuming the vehicle is moving along a roadway track at time 50 after a previous power mode of operation and with the chopper main thyristor C not conducting, the armature current as shown by curve 52 and the field current as shown by curve 54 are both zero. To initiate the brake mode of operation at time 56, both the power thyristor TP and the brake thyristors TB are fired to be conductive and the field current builds up to a value as regulated by the main thyristor C. When the field current has stabilized, at time 58 the power thyristor TP is commutated and the armature current as shown by curve 52 goes to a controlled reverse value corresponding with the field current shown by curve 54 and as determined by the chopper main thyristor C controlling these current values in the brake mode of operation. When the brake mode is no longer desired by the P signal, the main thyristor C stops conducting and the armature current goes to zero as does the field current.

It is readily apparent and known by persons skilled in this art how to provide the required firing and commutation control signals from the conduction control apparatus CA to effect each of the power mode, brake mode and coast mode operations as illustrated in FIGS. 5 and 6.

We claim:

1. In control apparatus for a plurality of direct current motors operative with a voltage source and responsive to an effort request signal for determining one of a power mode of operation and a brake mode of operation for said motors, with each of said motors having an armature and a field, the combination of circuit means having first and second terminals and a first circuit including the armature and field of a first motor and a second circuit including the armature and the field of a second motor connected between said first and second terminals, with said circuit means having third and fourth terminals and a third circuit including the first motor armature and the second motor field and a fourth circuit including the first motor field and the second motor armature connected between said third and fourth terminals, first switch means connected between said voltage source and said first and second terminals to establish said power mode and provide power current in said first and second circuits to energize the first and second motor armatures in a first direction, second switch means connected between said voltage source and said third and fourth terminals to establish the brake mode and provide brake current in said third and fourth circuits to energize the first and second motor armatures in a second direction, first current sensing means connected with said circuit means to provide a first output signal in accordance with the power current in said first and second circuits and the brake current in said third and fourth circuits, and second current sensing means connected with said circuit means to provide a second output signal in accordance with the power current in said second circuit and the brake current in said third circuit.

2. The control apparatus of claim 1, including control means responsive to said effort request signal and said first and second output signals and coupled to make the second switch means conductive to determine said power mode of operation and coupled to make the second switch means conductive to determine said brake mode of operation.

3. The apparatus of claim 1, with said first current sensing means being connected between first and third terminals and between the second and fourth terminals.

4. The control apparatus of claim 1, with the first current sensing means being operative to sense current flow between the first and third terminals and between the second and fourth terminals.

5. The control apparatus of claim 1, with the first current sensing means being responsive to the direction of current flow in relation to each of the first and second motor armatures.

6. The control apparatus of claim 1, with the second current sensing means being responsive to the current flow in one of the first and second motor fields.

7. The control apparatus of claim 1, with each of the first switch means and the second switch energizing the first and second motor fields in the same direction.

* * * * *